July 7, 1925.
A. O. EDWARDS
AMUSEMENT APPARATUS
Filed Sept. 5, 1922
1,545,240
2 Sheets-Sheet 1
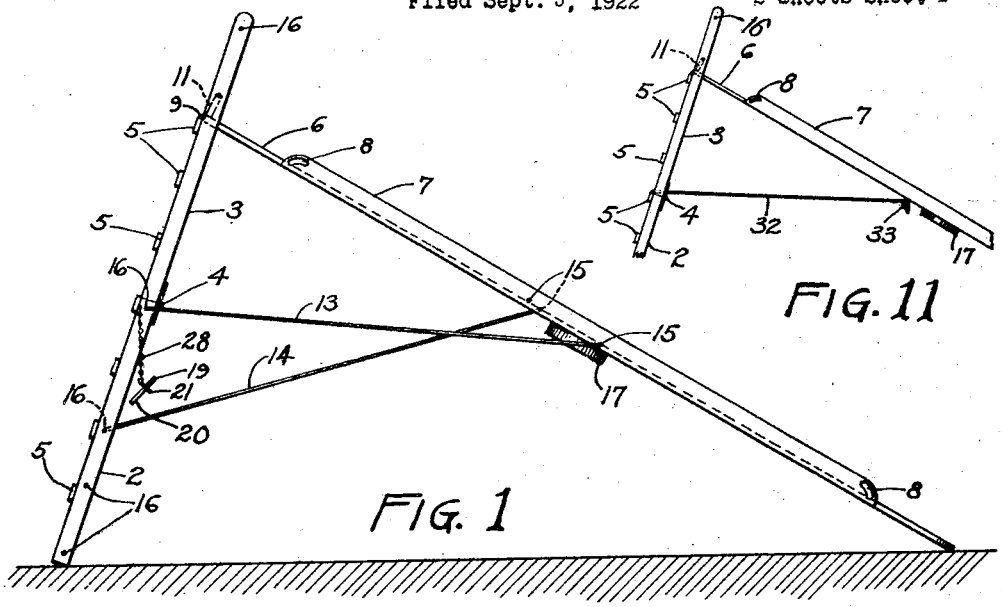
FIG. 1
FIG. 11
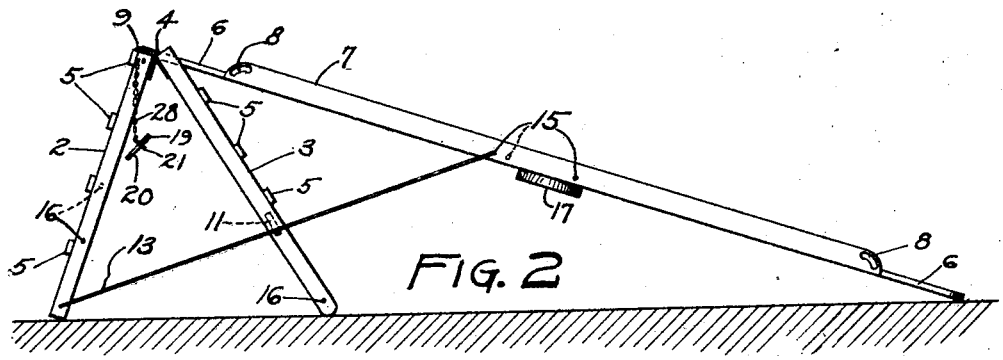
FIG. 2
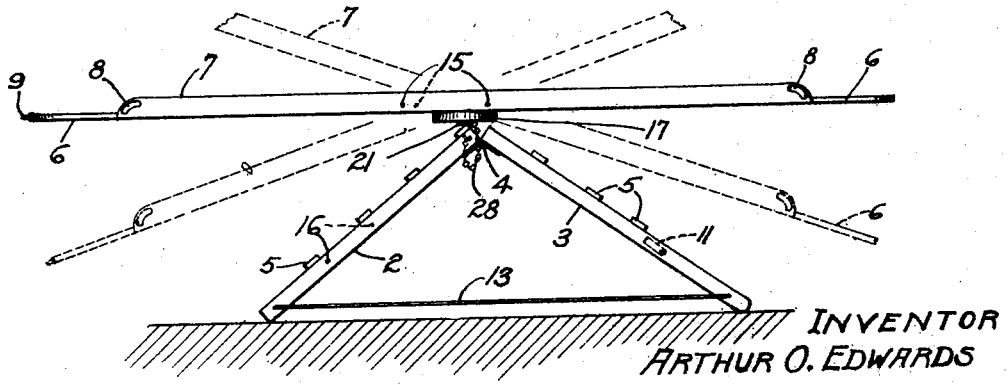
FIG. 3
INVENTOR
ARTHUR O. EDWARDS
ATTORNEYS July 7, 1925.
A. O. EDWARDS
AMUSEMENT APPARATUS
Filed Sept. 5, 1922
1,545,240
2 Sheets-Sheet 2
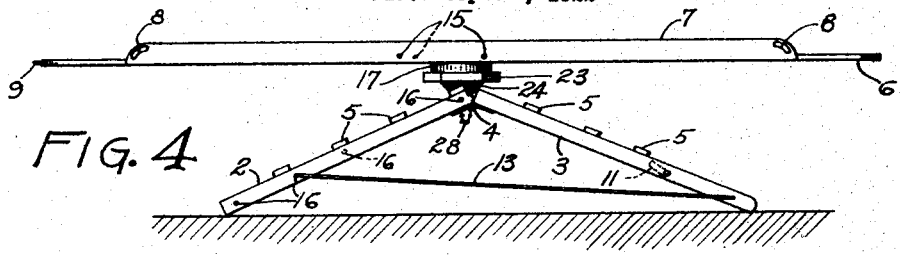
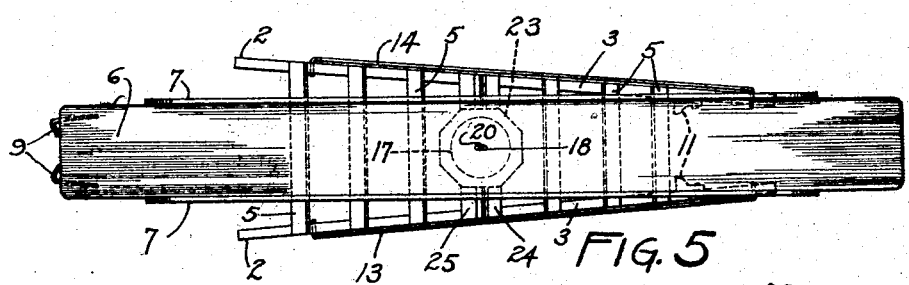
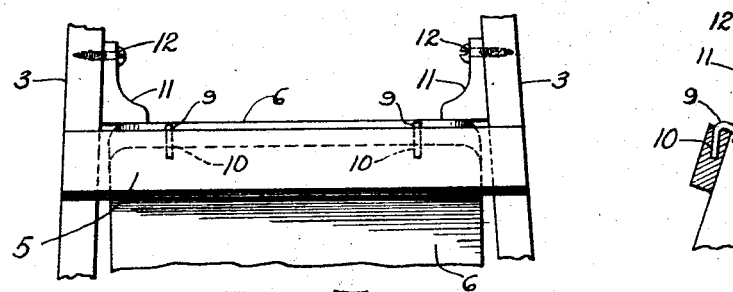
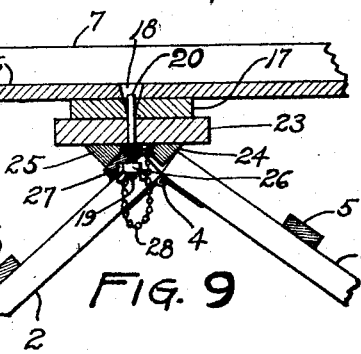
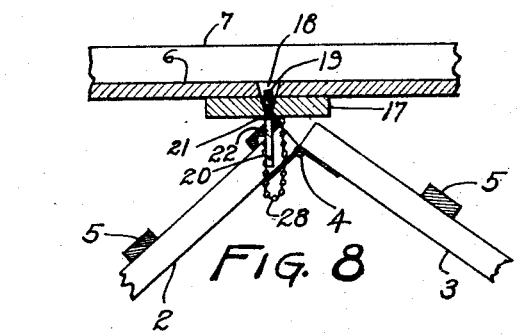
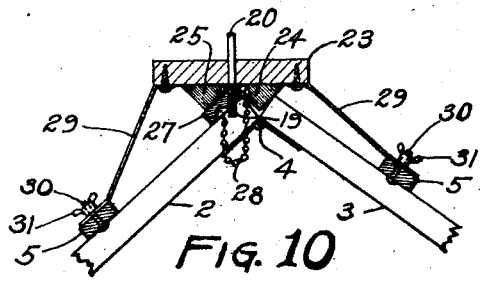
INVENTOR
ARTHUR O. EDWARDS
ATTORNEYS Patented July 7, 1925.

1,545,240

UNITED STATES PATENT OFFICE.

ARTHUR O. EDWARDS, OF MINNEAPOLIS, MINNESOTA.

AMUSEMENT APPARATUS.

Application filed September 5, 1922. Serial No. 586,189.

*To all whom it may concern:*

Be it known that I, ARTHUR O. EDWARDS, a citizen of the United States, resident of Minneapolis, county of Hennepin, and State of Minnesota, have invented certain new and useful Improvements in Amusement Apparatus, of which the following is a specification.

The object of my invention is to provide an amusement apparatus which can be easily and quickly converted from a slide to a teeter-board or a board revolving around a central axis in much the same manner as a merry-go-round.

A further object is to provide an apparatus in which the slide, the teeter-board, and the revolving board can be adjusted for different elevations as desired.

A further object is to provide an apparatus of the class described of comparatively simple, inexpensive construction and at the same time, very strong and durable.

The invention consists generally in various constructions and combinations all as hereinafter described and pointed out in the claims.

In the accompanying drawings forming part of this specification,

Figure 1 is a side elevation of the apparatus adapted for use as a slide with a comparatively steep incline.

Figure 2 is a similar view showing the apparatus adjusted for an incline of less degree, and adapted for smaller children.

Figure 3 is a side elevation showing the device adapted for use as a teeter-board and raised a considerable distance above the ground.

Figure 4 is a similar view showing the apparatus adapted for use as a merry-go-round and adjusted with the board at a lower level.

Figure 5 is a top view of the apparatus as shown in Figure 4.

Figure 6 is a detail sectional view showing the manner of connecting the upper end of the slide to its support.

Figure 7 is a view looking toward the upper end of the slide, showing the manner of securing it to the supporting ladder or horse.

Figure 8 is a detail sectional view showing the pivot of the teeter-board.

Figure 9 is a detail sectional view showing the device adapted for revolving the board on a central axis.

Figure 10 illustrates a modification of the means for supporting the fifth wheel or supporting plate on which the teeter-board turns.

Figure 11 is a detail view illustrating a modified means for bracing the slide between it and the supporting ladder.

In the drawing, 2 and 3 represent the sections of the horse or ladder hinged together at 4, and provided with the usual cross-bars or steps 5, on which the child may easily climb to the upper end of the slide.

The side rails of the ladder are preferably of wood of suitable dimensions and are made sufficiently strong to support any weight to which they may be subjected, and preferably diverge toward the lower end to render the device more stable.

6 represents a slide comprising a smooth surface board having guard rails 7 on each side, provided with hand-holds 8, the rails terminating short of the ends of the board and having smooth rounded edges with the hand-holds in convenient position to be grasped while the child is passing from the ladder to the slide. The end of the slide has hooks 9 mounted therein, adapted to enter sockets 10, in the upper cross-bar of the ladder, and latches 11 are pivoted at 12 on the side rails of the ladder, and adapted to swing down and engage the end of the slide and prevent it from becoming prematurely or accidentally disengaged from the ladder bar. The lower end of the slide rests upon the ground and suitable brace rods 13 and 14 have hooked ends to enter holes 15 in the slide, and similar holes 16 in the side rails of the ladder; thus, tying the ladder sections and slide together and preventing them from spreading or separating when subjected to load.

The ladder shown in Figure 1 has its sections in alignment with each other, and extended its full length with the slide at the top of the ladder, this adjustment adapting the device for larger children.

To prevent the ladder from accidentally jackknifing or folding when in the above position, I prefer to arrange the rods 13 and 14, as shown, i. e., the rod 13 will have one end secured to the lower section 2 of the ladder adjacent its upper end, and the other end of said rod will be secured to the slide slightly below its center. The rod 14 will also have one end secured to the ladder section 2, but near its central portion, while the other end will be secured to the slide slightly above its center. By crossing the rods as above described, the ladder is positively prevented from accidentally folding, and also the entire apparatus may be moved about on the ground without danger of collapsing.

In Figure 2, I have shown the ladder sections partially folded to form a horse so that the ends of the side rails of the upper section 3, also rest upon the ground and the slide is carried by the cross-bar at the upper end of the lower section. With this arrangement, the brace or tie-rods, are preferably connected with the middle portion of the slide, and from thence extend to the lower ends of the lower section, being hooked into the holes in the slide and ladder section as described with reference to Figure 1. I am thus able by providing the sectional support or ladder to easily and quickly adapt the slide for different elevations and inclines.

The middle portion of the slide has a block 17 on the under side thereof, and the slide and block have a tapered socket 18 therein to receive the threaded upper end 19 of a pin 20 having a flange 21 that is seated against the under side of the block 17, the lower end of the pin projecting into a socket 22 in the upper cross-bar or step of the lower section of the ladder. The block 17 rests upon the bar, and the tapered opening 18 in the slide and block, allows the slide to rock freely back and forth on the pin and serve as a teeter-board; the ends of the slide projecting beyond the guard rails forming comfortable seats for the children, and the hand-holds being conveniently located so that the children can easily grasp them while the board is used as a teeter. The tie-rods 13 and 14 are inserted into sockets provided in the lower ends of the ladder sections to hold them at the desired angle, and the teeter-board at the desired elevation. This elevation may be varied by changing the adjustment of the tie-rods in the ladder sections.

The device is also adapted for use as a revolving board or merry-go-round. This, I accomplish, by providing a plate or fifth wheel 23 having triangular strips 24 and 25 on the under side thereof, adapted to fit the angle between the hinged ends of the ladder sections and the incline surfaces of the cross-bar at the top of the lower section. The pin or bolt 20 is then reversed, its threaded end passing through the socket in the bar and secured therein by a lock-nut 26 which fits within a recess 27 in the cross-bar. The upper end of the bolt passes through the plate 23, and the block 17, and forms a vertical pivot on which the slide may revolve so that the child may use the device as a merry-go-round, or by simply removing the flat supporting plate 23 may use it as a teeter-board. The bolt 20 is preferably permanently connected with the ladder section by a flexible means, such as a chain 28. It will be noted that by the mere reversal of this bolt, it is adapted as a pivot to allow the teeter-board to be rocked freely thereon, or as a vertical axis around which the board may revolve.

In Figure 10, I have shown a slight modification which consists in providing straps 29 secured at one end to the plate 23, and at the other end to the cross-bars of the ladder sections by bolts 30, having wing-nuts 31. By this means, the plate 23 will be rigidly held on its supports without the use of the lock nut 26. This revolving board or merry-go-round, may be supported at different elevations by merely changing the position of the tie-rods connecting the sections of the ladder.

In Figure 11, I have shown another modification in which a single brace rod 32 is used instead of the rods 13 and 14. This rod has one end secured to the under side of the slide by means of an eye bolt 33, and has its other end connected to the upper cross-bar of the lower ladder section 2.

I am thus able with a ladder made in this way to easily and quickly adapt the device for slides or teeter-boards of different elevations and as readily convert the teeter-board tilting on a horizontal axis to one revolving on a vertical axis.

I claim as my invention:

1. An apparatus of the class described comprising ladder sections having abutting ends hinged together for adjustment in alignment with each other or partially folded with one end of each section resting upon the ground with board supporting means on each section, and a board having means to selectively connect with the board supporting means in either position of the ladder whereby when the ladder sections are in alignment with each other the board may be connected thereto to provide an elevated slide or when the ladder is partially folded the board may be connected thereto to form a lower slide.

2. An apparatus of the class described comprising a ladder section having cross bars having sockets therein, a board having hooks at one end to enter the sockets in one of said cross-bars, and latches pivoted on said ladder section to engage said board and prevent the accidental removal of said hooks from said sockets, said ladder section and said board cooperating to form an inclined slide.

3. An apparatus of the class described comprising a board, a ladder adapted to be folded and in its extended and folded positions to act as a support with means near its middle and one end to support said board respectively in folded and extended position of the ladder, narrow strips secured to said board upon each side thereof and extending along the middle portion thereof but terminating short of both ends of the board to provide seats on either end of the board, one end and the middle portion of said board having means for connecting it with the supporting means whereby the apparatus may be used as a slide or a teeter, and crossed tie rods adapted to connect said board near its middle portion, to the upper and lower portions of the support when the board is used as a slide.

4. An amusement apparatus comprising a foldable support, a board having means at one end to attach it to said support, a block secured to the under side of the board and provided with a tapered opening, and a bolt to connect the block and support whereby the apparatus may be used as a slide or a teeter board.

5. An apparatus of the class described comprising a sectional ladder adapted to be folded and in its extended or folded position to act as a support with means near its middle and one end to support a board, a plate having a hole therein and secured to said ladder, a bolt adapted to engage the hole in the plate and hold it to said ladder and a board attached midway to said plate and having means at its end cooperative with both of said board supporting means to attach it to said support.

6. An apparatus of the class described, comprising a support, a board having means at one end to detachably hold it to said support whereby the apparatus may be used as a slide by tie rods extending from the board to the support in crossed relation to each other to prevent collapse of the apparatus when so used, the board having a hole near its middle portion, a plate attachable to the support and also having a hole therein, and a bolt to pass through the holes in the board and plate to hold them and the support in operating position whereby the apparatus may be used as a merry-go-round.

In witness whereof, I have hereunto set my hand this 31st day of August, 1922.

ARTHUR O. EDWARDS.